Figure 1:
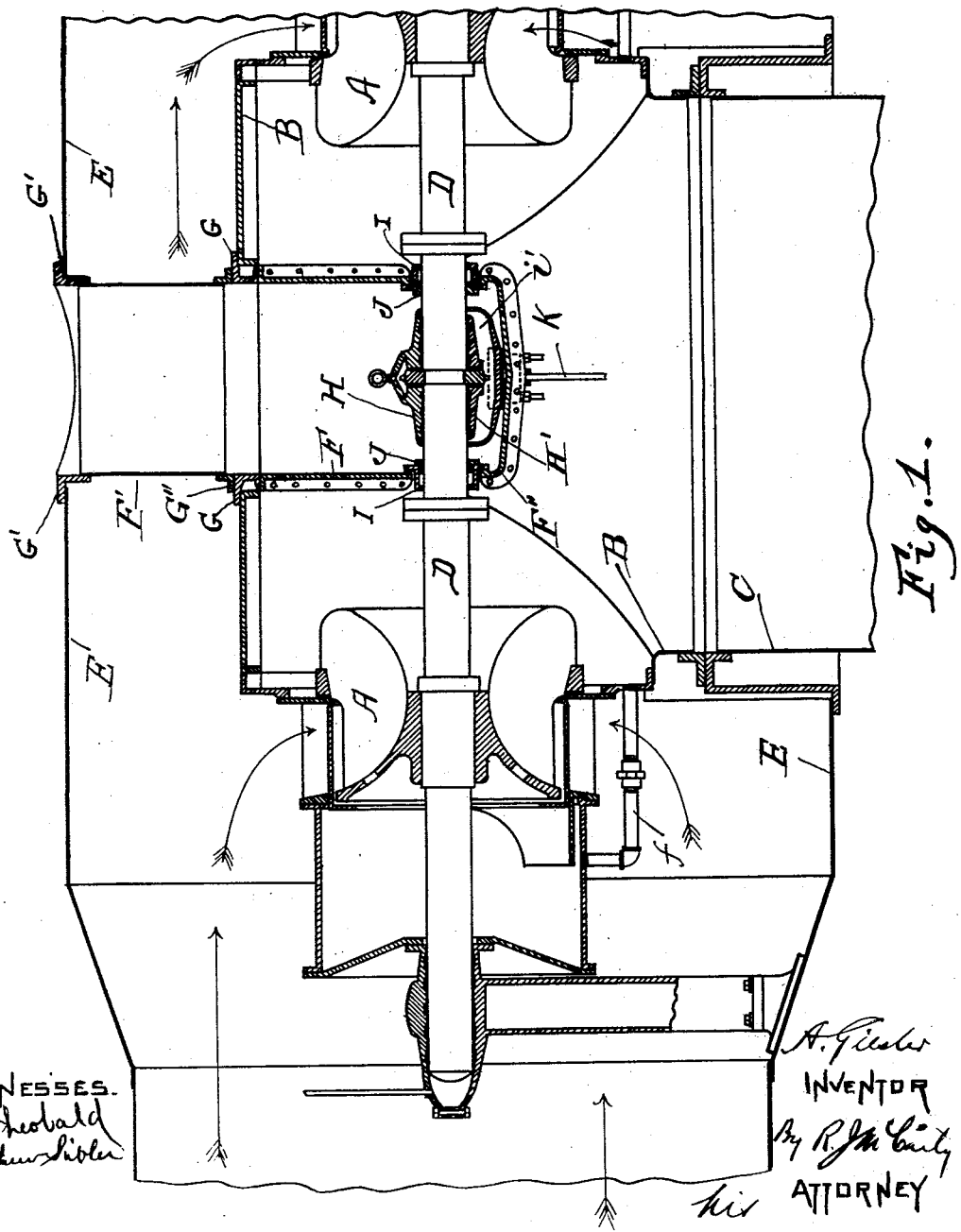

No. 750,761. PATENTED JAN. 26, 1904.
A. GIESLER.
WATER WHEEL SETTING.
APPLICATION FILED APR. 7, 1902.
NO MODEL. 3 SHEETS—SHEET 1.

WITNESSES.
INVENTOR
ATTORNEY

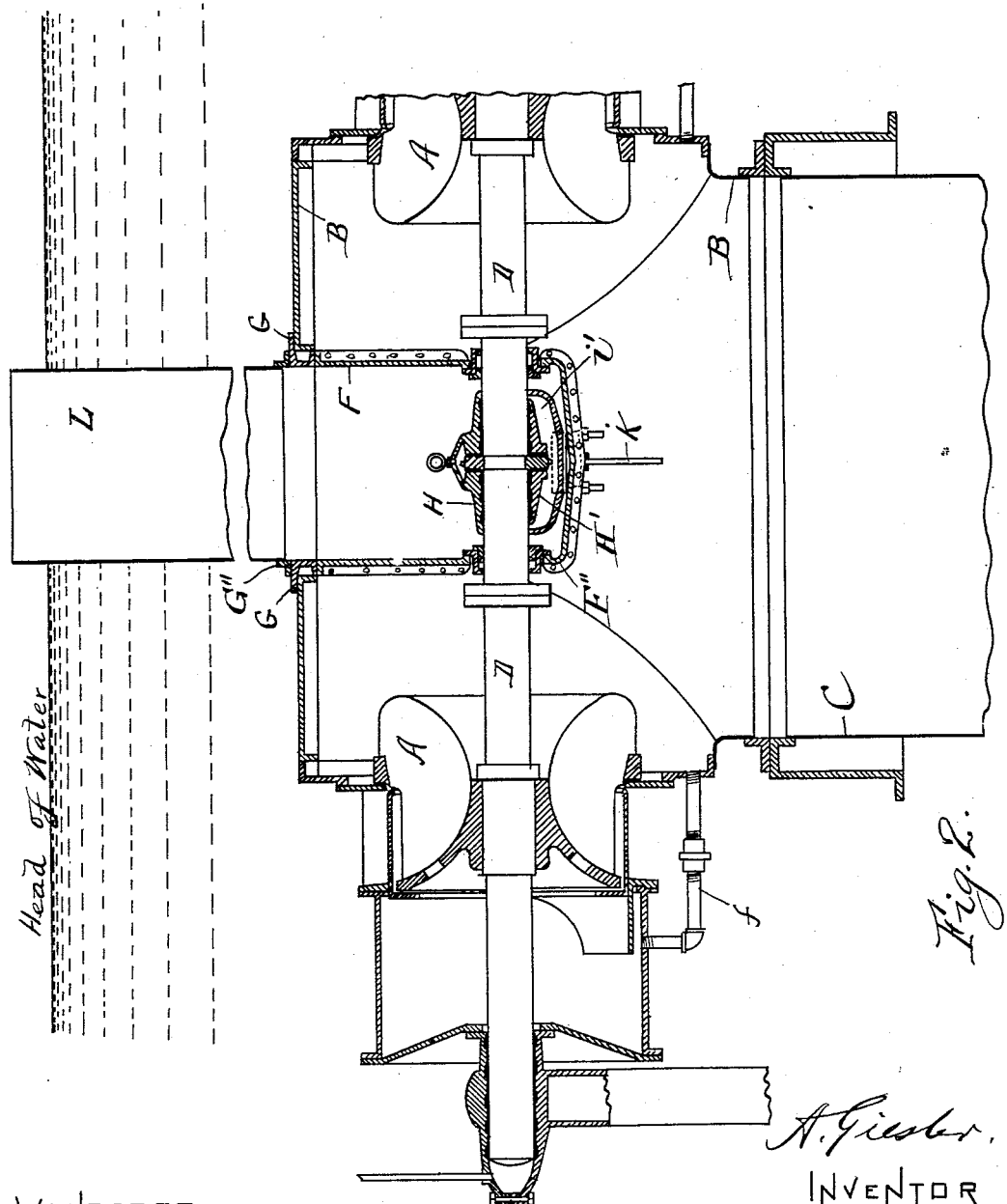

No. 750,761. PATENTED JAN. 26, 1904.
A. GIESLER.
WATER WHEEL SETTING.
APPLICATION FILED APR. 7, 1902.
NO MODEL. 3 SHEETS—SHEET 3.

Witnesses
J. Fred Hemberger.
C. M. Theobald.

Arthur Giesler,
Inventor
By R. J. McCarty,
his Attorney.

THE NORRIS PETERS CO., PHOTO-LITHO., WASHINGTON, D. C.

No. 750,761. Patented January 26, 1904.

UNITED STATES PATENT OFFICE.

ARTHUR GIESLER, OF DAYTON, OHIO, ASSIGNOR TO THE STILWELL-BIERCE & SMITH-VAILE CO., OF DAYTON, OHIO, A CORPORATION OF NEW JERSEY.

WATER-WHEEL SETTING.

SPECIFICATION forming part of Letters Patent No. 750,761, dated January 26, 1904.

Application filed April 7, 1902. Serial No. 101,723. (No model.)

*To all whom it may concern:*

Be it known that I, ARTHUR GIESLER, a citizen of the United States, residing at Dayton, in the county of Montgomery and State of Ohio, have invented certain new and useful Improvements in Water-Wheel Settings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in water-wheels, and has a specific reference to means for protecting oil-bearings of the wheel-shaft from water.

Before the era of electricity and its generation by water-wheel power a high rate of speed of the wheel-shaft was not generally required; but since the era referred to the demand upon water-wheels has been very materially changed, and at the present time in order to make a commercial success of a power-station, a high rate of speed for the wheel-shaft is a very great essential and a very necessary feature in a high-grade power equipment. Under the modern requirements wooden boxes or bearings are altogether inefficient for water-wheel shafts.

It is the object of this invention to improve the conditions of the bearings.

It has heretofore been customary in horizontal water-wheel settings, where a multiplicity of wheels are used, to employ hardwood bearings—such, for example, as lignum-vitæ—with the water as a lubricant. Such bearings are of a very short life, owing to the nature of the material used. The wear of the wooden boxes being very rapid, the wheel-shafts become out of alinement in a short time. As a consequence of this a very material increase in friction resulted and much repair-work was rendered necessary.

It is well known that babbitted metal boxes for the bearings of water-wheel shafts have always been much desired, owing to their wearing qualities and because a lubricant such as oil can be used on such bearings much more successfully than on wooden bearings. It has heretofore been impracticable to use metal bearings, owing to the impossibility of applying oil or grease as a lubricant to such bearings. In other words, these bearings were necessarily put in places to which water had access—for example, in the draft-tube and in the casings under water-pressure. Wooden bearings have always been placed in the draft-tube and also in the casing under water-pressure and depended upon water as a lubricant. In the case of metal bearings it is obviously decidedly objectionable to place them in water or where water will flow over them. The objection to wooden bearings and water as a lubricant is avoided in the present invention by providing a shaft-bearing of metal, the same being located in a draft-tube of a water-wheel setting or in a flume surrounded by water-pressure, due to its head, by providing a separate chamber for said bearings from which water is excluded and which is surrounded by either pressure or a vacuum, as the case may be. The bearings thus placed are prevented from being flooded by water and can be inspected and lubricated, if necessary, at any time while the wheels are in motion. The inclosed chamber within the draft-box above referred to and which I will term the "bearing-chamber" may be drained of any water that might possibly find its way to such chamber through the stuffing-boxes surrounding the wheel-shaft, so that there is no possibility of water accumulating in said chamber to interfere with the bearings or a proper lubrication thereof.

Preceding a detail description of my invention, reference is made to the accompanying drawings, of which—

Figure 4:
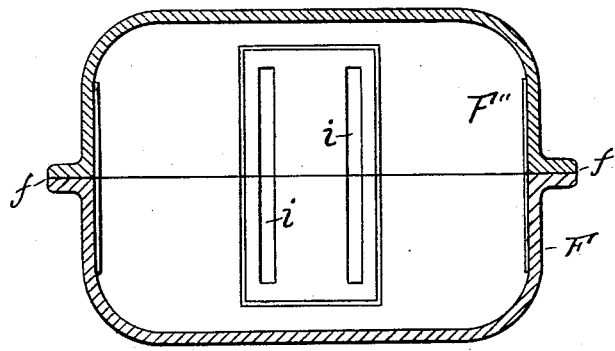
Figure 5:
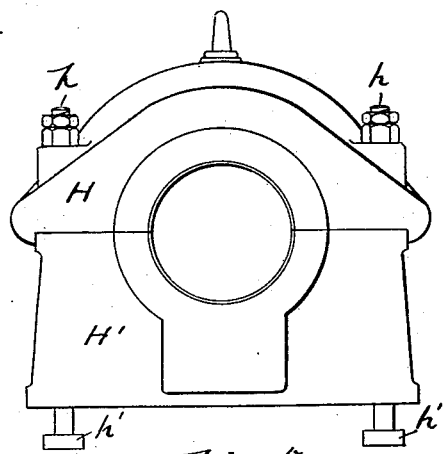
Figure 3:
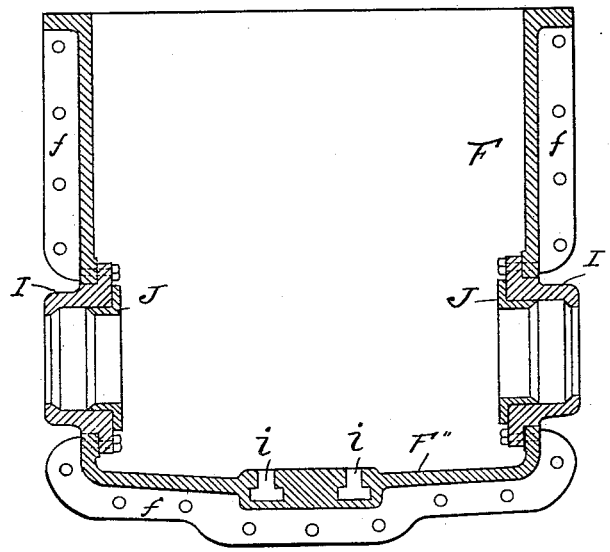
Figure 6:
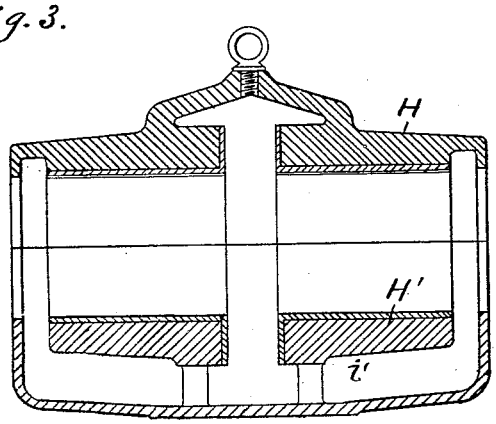

Figure 1 is a vertical longitudinal sectional elevation of a water-wheel setting surrounded by a tubular iron casing under water-pressure. Fig. 2 is a vertical longitudinal sectional elevation of a water-wheel setting similar to Fig. 1, with the exception that the wheel-casing is not surrounded by a tubular iron casing, but is designed to be mounted in what is termed an "open" flume. Fig. 3 is an enlarged vertical section of the bearing-chamber. Fig. 4 is a horizontal section of the same. Fig. 5 is an enlarged end elevation of the shaft-bearing. Fig. 6 is a vertical section of the same.

In a detail description of the invention similar reference-letters indicate corresponding parts in the several views of the drawings.

The different views above referred to are provided in order to show the bearing-chamber of the case installed both in a closed flume and in an open penstock.

A A designate a pair of turbines mounted on shaft D on each side of a draft-box B, the said draft-box B terminating in a draft-tube C. The wheel-setting, as shown in Fig. 1, is surrounded by a tubular iron penstock or casing E under water-pressure and through which the water is conducted to the wheels, as shown by the several arrows.

F F' designate lower and upper parts of a casing forming a water-tight bearing-chamber, which extends from the middle of the wheel-setting to the outside of the wheel-casing E and is surrounded by water-pressure in said wheel-casing and by a vacuum in the draft-box B. The functions of said bearing-chamber may be briefly stated to be the prevention of water entering said chamber from the draft-box, the prevention of atmospheric air entering the draft-box, and to enable the shaft-bearings located therein to be easily accessible for the purpose of oiling, &c. The lower portion of said bearing-chamber consists of two equal halves terminating in bottoms F" and having flanges $f$ throughout their edges, by means of which they are rigidly bolted together. By thus constructing said chamber the bearings which are supported on the bottom thereof may be exposed for inspection or repairs by disconnecting and separating the chamber. The upper end of the lower portion F of the bearing-chamber is rigidly attached to the upper side of the draft-box B, suitable flanges G being provided which engage with the surrounding edge of the draft-box for this purpose. The lower end of the upper portion F' of said bearing-chamber is similarly united by means of flanges G" to the lower portion F, and the extreme upper end of said portion F' is provided with flange G', which is secured to the wheel-casing E. It will be understood that the connections between the portions F and F' of the bearing-chamber and the draft-box B and the wheel-casing E must necessarily be water-tight. Therefore suitable packing-glands may be provided wherever necessary. The water-wheel shaft D passes through boxes I I in opposite sides of the bearing-chamber, said boxes being provided with suitable packing-glands J J, which are packed and drawn up from the inner side to exclude any possible entry of water to the bearing-chamber. The shaft D is provided with bearings on the interior of said chamber consisting of two halves H and H', which are clamped together by bolts $h$, the heads $h'$ of which fit in slots $i$ in the bottom F" of the bearing-chamber. The bearing has a suitable chamber $i'$ for the oil. By securing the heads of the bolts in the slots $i$ the two members of the bearing may be most rigidly drawn together.

K designates a drain-pipe leading from the bearing-chamber and extending through the interior of the draft-tube C and thence into the tail-water and making an air-tight seal on the lower end of said pipe. The construction illustrated in Fig. 2 is substantially the same as that shown in Fig. 1, with the exception that in Fig. 2 L designates a more extended continuation of the bearing-chamber F. The extension L is of sufficient length to project above the surface of the head-water and is not surrounded by a casing under pressure, as is the case in Fig. 1. Access may be had to the bearing-chamber through the extension L by means of a stairway located on the interior of said extension.

Having described my invention, I claim—

In a water-wheel setting, the combination of a draft-box, a bearing-chamber within said draft-box and from which water is excluded, a water-wheel shaft extending through said bearing-chamber, and a bearing located within said chamber for said shaft, substantially as set forth.

In testimony whereof I affix my signature in presence of two witnesses.

ARTHUR GIESLER.

Witnesses:
R. J. McCarty,
C. M. Theobald.